United States Patent
Friebe et al.

(10) Patent No.: US 10,477,102 B2
(45) Date of Patent: Nov. 12, 2019

(54) METHOD AND DEVICE FOR DETERMINING CONCEALED REGIONS IN THE VEHICLE ENVIRONMENT OF A VEHICLE

(71) Applicant: Conti Temic microelectronic GmbH, Nuremberg (DE)

(72) Inventors: Markus Friebe, Gefrees (DE); Felix Loehr, Koblenz (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 15/774,139

(22) PCT Filed: Oct. 24, 2016

(86) PCT No.: PCT/DE2016/200489
§ 371 (c)(1),
(2) Date: May 7, 2018

(87) PCT Pub. No.: WO2017/088863
PCT Pub. Date: Jun. 1, 2017

(65) Prior Publication Data
US 2018/0316850 A1 Nov. 1, 2018

(30) Foreign Application Priority Data
Nov. 24, 2015 (DE) .................. 10 2015 223 176

(51) Int. Cl.
*H04N 7/18* (2006.01)
*H04N 5/232* (2006.01)
(Continued)

(52) U.S. Cl.
CPC ......... *H04N 5/23218* (2018.08); *B60R 1/00* (2013.01); *G06K 9/00805* (2013.01);
(Continued)

(58) Field of Classification Search
CPC .......... H04N 5/23218; H04N 5/23296; H04N 7/181; H04N 7/188; B60R 1/00;
(Continued)

(56) References Cited

U.S. PATENT DOCUMENTS 8,908,035 B2   12/2014  Russ et al.
9,523,984 B1 *  12/2016  Herbach .............. B62D 15/025
(Continued)

FOREIGN PATENT DOCUMENTS

DE   102006052779   5/2008
DE   102014107156   11/2014
(Continued)

OTHER PUBLICATIONS

PCT, International Search Report of the International Searching Authority for International Application PCT/DE2016/200489, dated Feb. 10, 2017, 2 pages, European Patent Office, HV Rijswijk, Netherlands.

(Continued)

*Primary Examiner* — Helen Shibru
(74) *Attorney, Agent, or Firm* — W.F. Fasse

(57) ABSTRACT

A driver assistance system (1) for a vehicle includes environment sensors (2), which sense a vehicle environment of the vehicle, and a data processing unit (4), which evaluates sensor data of the environment sensors (2) to detect obstacles (H) in the vehicle environment. In accordance with detected obstacles (H), concealed regions (VB) in the vehicle environment of the vehicle are determined, which concealed regions are concealed by the obstacles (H) and restrict a field of view (FOV) of optical environment sensors (2) of the driver assistance system (1).

22 Claims, 4 Drawing Sheets

(51) Int. Cl.
*B60R 1/00* (2006.01)
*G06K 9/00* (2006.01)
*G08G 1/16* (2006.01)

(52) U.S. Cl.
CPC ......... *G06K 9/00825* (2013.01); *G08G 1/166* (2013.01); *H04N 5/23296* (2013.01); *H04N 7/181* (2013.01); *H04N 7/188* (2013.01); *B60R 2300/105* (2013.01); *B60R 2300/8093* (2013.01)

(58) Field of Classification Search
CPC ...... B60R 2300/105; B60R 2300/8093; B60R 2300/108; B60R 2300/301; B60R 2300/302; G06K 9/00805; G06K 9/00825; G08G 1/166; G02B 7/28; G03B 15/00
USPC ......................................................... 348/148
See application file for complete search history.

(56) References Cited

U.S. PATENT DOCUMENTS

| 9,834,143 | B2 | 12/2017 | Zhang et al. | |
| 10,331,142 | B2* | 6/2019 | Bar-Tal | G05D 1/0253 |
| 2007/0027612 | A1* | 2/2007 | Barfoot | G08G 1/20 |
| | | | | 701/117 |
| 2013/0245877 | A1* | 9/2013 | Ferguson | B60R 1/00 |
| | | | | 701/23 |
| 2017/0203692 | A1 | 7/2017 | Friebe et al. | |
| 2018/0362030 | A1* | 12/2018 | Ohl | B60W 30/09 |
| 2019/0196480 | A1* | 6/2019 | Taylor | G05D 1/0214 |

FOREIGN PATENT DOCUMENTS

| DE | 102013019145 | 5/2015 |
| WO | WO 2015/169316 | 11/2015 |

OTHER PUBLICATIONS

PCT, PCT International Preliminary Report on Patentability including English Translation of PCT Written Opinion of the International Searching Authority for International Application PCT/DE2016/200489, dated May 29, 2018, 5 pages, International Bureau of WIPO, Geneva, Switzerland.

German, German Search Report for German Patent Application No. 10 2015 223 176.3, dated Oct. 6, 2016, 8 pages, Muenchen, Germany, with English translation, 6 pages.

* cited by examiner

METHOD AND DEVICE FOR DETERMINING CONCEALED REGIONS IN THE VEHICLE ENVIRONMENT OF A VEHICLE

FIELD OF THE INVENTION

The invention relates to a method and a device for determining concealed regions in the vehicle environment of a vehicle, and in particular a driver assistance system, in which concealed regions which restrict the field of view of optical environment sensors of the driver assistance system are determined.

BACKGROUND INFORMATION

Vehicles increasingly comprise driver assistance systems which support the driver of the vehicle during the performance of driving maneuvers. Such driver assistance systems have display units which optically display the vehicle environment of a vehicle to the driver. The vehicle cameras, which generate camera images of the vehicle environment, transfer said images or image data to a data processing unit, which projects the image data onto a predefined projection surface, in order to display them to the driver on a display. In addition to vehicle cameras or optical sensor units, driver assistance systems also have additional environment sensors, for example ultrasonic sensors.

In conventional driver assistance systems, if obstacles occur in the vehicle environment, for example if other vehicles are parked in the vicinity of the vehicle, this can result in disturbing image distortions of the displayed image of the vehicle environment. These image distortions are produced by concealed regions which restrict a field of view of optical environment sensors of the driver assistance system.

SUMMARY OF THE INVENTION

It is therefore an object of an embodiment of the present invention to provide a method and a device for determining such concealed regions in the vehicle environment of a vehicle.

This object can be achieved according to an embodiment of the invention by a device having the inventive features set forth herein.

Accordingly, the invention creates a driver assistance system for a vehicle, comprising
environment sensors, which sense a vehicle environment of the vehicle, and
a data processing unit, which evaluates sensor data of the environment sensors in order to detect obstacles in the vehicle environment of the vehicle,
wherein, in accordance with detected obstacles, concealed regions in the vehicle environment of the vehicle are determined, which concealed regions are concealed by the obstacles and restrict a field of view of optical environment sensors of the driver assistance system.

The concealed regions produced by the detected obstacles are, in this case, preferably determined in accordance with a relative location of the relevant obstacle with respect to an optical environment sensor of the driver assistance system and/or in accordance with the extent or size of the relevant obstacle.

In one possible embodiment of the driver assistance system according to the invention, the data processing unit processes image sensor data which originate from optical environment sensors, in particular vehicle cameras, in the determined concealed regions.

In one possible embodiment of the driver assistance system according to the invention, the determined concealed regions are processed by the data processing unit in that the image sensor data are filtered by a filter.

In another possible embodiment of the driver assistance system according to the invention, the data processing unit covers the concealed regions produced by the detected obstacles with textured surfaces.

In another possible embodiment of the driver assistance system according to the invention, the data processing unit additionally calculates the concealed regions produced by the detected obstacles dependent on a projection surface used for representing the images, in particular dependent on a static two-dimensional ground surface or dependent on a three-dimensional bowl-shaped projection surface.

In another possible embodiment of the driver assistance system according to the invention, a control circuit is provided, which, dependent on the concealed regions produced by the detected obstacles, controls optical environment sensors, in particular vehicle cameras of the driver assistance system.

In one possible embodiment of the driver assistance system according to the invention, the control circuit switches, in this case, dependent on the determined concealed regions, between different optical environment sensors of the driver assistance system.

In another possible embodiment of the driver assistance system according to the invention, the optical environment sensors comprise vehicle cameras, in particular fisheye cameras, which each have a predefined field of vision.

In another possible embodiment of the driver assistance system according to the invention, the data processing unit calculates the concealed regions produced by the detected obstacles in accordance with the fields of vision of the relevant optical environment sensors.

In another possible embodiment of the driver assistance system according to the invention, the data processing unit calculates the concealed regions produced by the detected obstacles in accordance with a relative speed between the detected obstacles and the vehicle.

The invention further provides a method for determining concealed regions having the inventive features set forth herein.

Accordingly, the invention creates a method for determining concealed regions in the vehicle environment of a vehicle comprising the steps of:
evaluating sensor data, which are generated by environment sensors of the vehicle, in order to detect obstacles in the vehicle environment of the vehicle, and
calculating, in accordance with the detected obstacles, concealed regions which are concealed by the obstacles and restrict a field of view of the optical environment sensors of the vehicle.

In one possible embodiment of the method according to the invention, the image data sensor originating from optical environment sensors are processed, in particular filtered.

In another possible embodiment of the method according to the invention, the concealed regions produced by the detected obstacles are covered with textured surfaces.

In another possible embodiment of the method according to the invention, the concealed regions produced by the detected obstacles are calculated dependent on a two-dimensional or three-dimensional projection surface used for representing the images.

In another possible embodiment of the method according to the invention, optical environment sensors, in particular vehicle cameras, are controlled dependent on the determined concealed regions.

In another possible embodiment of the method according to the invention, the system switches between different optical environment sensors, in particular vehicle cameras, dependent on the determined concealed regions.

In another possible embodiment of the method according to the invention, the concealed regions produced by the detected obstacles are calculated dependent on the predefined fields of vision of the relevant optical environment sensors.

In another possible embodiment of the method according to the invention, the concealed regions produced by the detected obstacles are calculated dependent on a relative speed between the detected obstacles and the vehicle.

BRIEF DESCRIPTION OF THE DRAWINGS

Possible embodiments of the driver assistance system according to the invention and of the method according to the invention for determining concealed regions are explained in greater detail below, with reference to the appended figures, wherein.

DETAILED DESCRIPTION OF EXAMPLE EMBODIMENTS OF THE INVENTION

Figure 1:
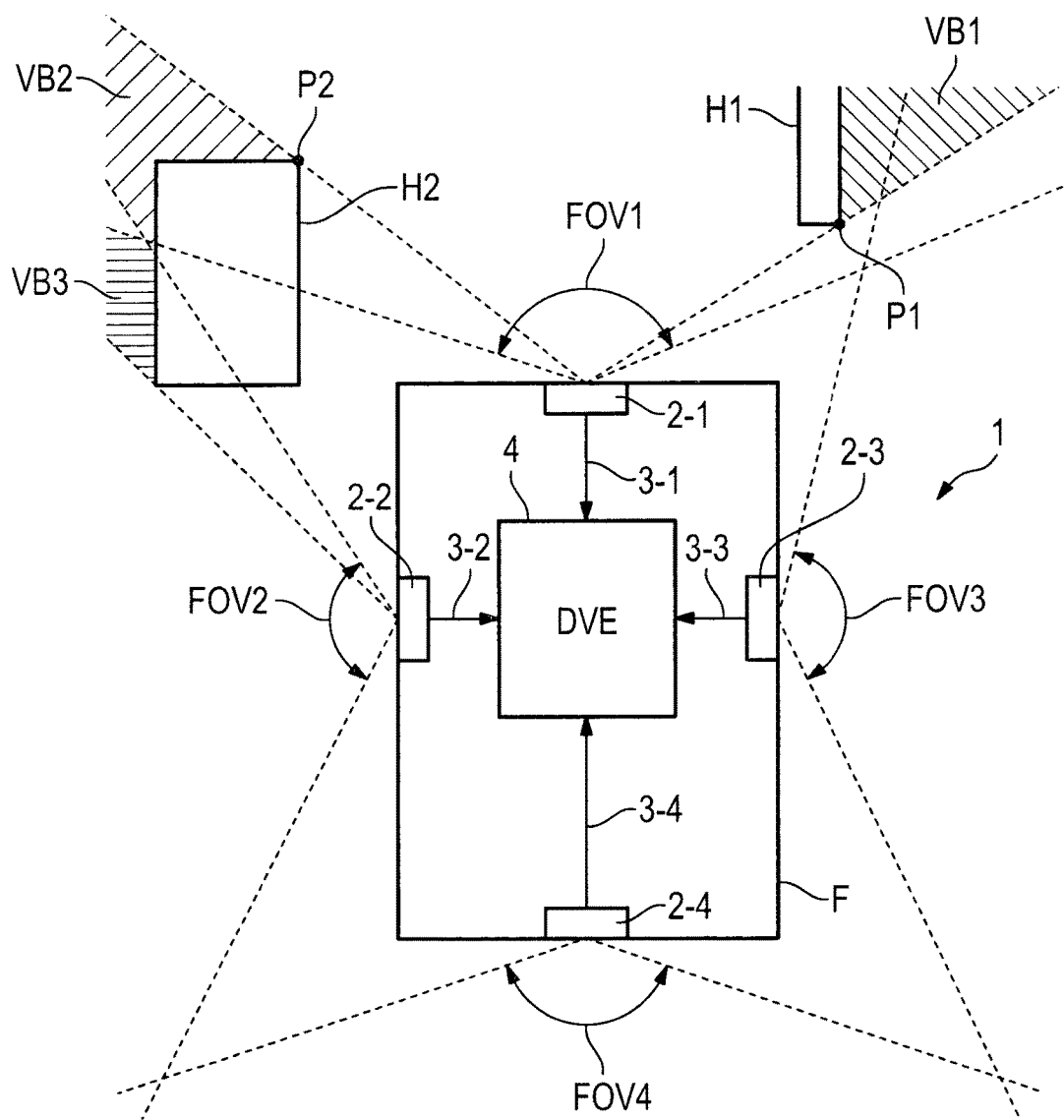
FIG. 1 shows a schematic representation of an embodiment example of the driver assistance system according to the invention.

FIG. 1 schematically shows a vehicle F, which has a driver assistance system according to the invention. In the represented embodiment example, optical environment sensors are mounted on different sides of the bodywork of the vehicle F, which optical environment sensors sense the vehicle environment of the vehicle F. The optical environment sensors can be, for example, vehicle cameras which supply vehicle images of the vehicle environment. In the embodiment example represented in FIG. 1, the driver assistance system 1 of the vehicle F has four vehicle cameras 2-1, 2-2, 2-3, 2-4. In this case, the first vehicle camera 2-1 is mounted on the front of the bodywork of the vehicle F and has a field of vision or field of view FOV1, as represented in FIG. 1. Furthermore, a vehicle camera is located on each of the left and right sides of the vehicle bodywork of the vehicle F, said vehicle cameras optically detecting the lateral vehicle environment of the vehicle F. The vehicle camera 2-2 mounted on the left side of the vehicle F has a field of vision or field of view FOV2. The right vehicle camera 2-3 detects the part of the vehicle environment situated on the right of the vehicle F and has a field of view FOV3, as represented in FIG. 1. Furthermore, a vehicle camera 2-4 having a field of view FOV4 is provided on the back or rear side of the vehicle F. The four optical environment sensors 2-1 to 2-4 can, in one possible embodiment, be fisheye cameras having a relatively wide field of view FOV of more than 170°. As can be seen in FIG. 1, the fields of view FOV or fields of vision of the different vehicle cameras 2-i of the driver assistance system 1 can overlap one another. The different vehicle cameras 2-i are connected by means of signal lines 3-1, 3-2, 3-3, 3-4, for example by means of a signal line bus or vehicle bus, to a data processing unit (DVE) 4 of the driver assistance system 1. Sensor data, in particular camera images, are transmitted to the data processing unit 4 by means of the signal lines 3-i. The data processing unit 4 evaluates the sensor data of the environment sensors, in particular of the optical environment sensors or vehicle cameras 2-i represented in FIG. 1, in order to detect obstacles H in the vehicle environment of the vehicle F. To this end, the data processing unit 4 has a processor which carries out the data evaluation of the sensor data. The sensor data are preferably processed in real time. In addition to the optical environment sensors 2-i, the driver assistance system 1 can also have additional environment sensors, for example ultrasonic sensors. These additional environment sensors likewise supply sensor data which can be evaluated by the data processing unit 4, in order to detect obstacles H in the vehicle environment of the vehicle F. In the case of the example represented in FIG. 1, two obstacles H1, H2, for example a wall and a building, are located in the vehicle environment of the vehicle F. In the case of the example represented in FIG. 1, the obstacle H1 is located in the field of view FOV1 of the front vehicle camera 2-1. The second obstacle H2 is located partially in the field of view of the front vehicle camera 2-1 and partially in the field of view of the left vehicle camera 2-2. The obstacles H1, H2 in the vehicle environment are detected based on the sensor data obtained. These sensor data can, on the one hand, originate from the vehicle cameras 2-i represented in FIG. 1 and/or from additional environment sensors of the driver assistance system 1. In this case, the size or extent of the respective obstacle H-i is determined. In accordance with the size or contour, concealed regions VB which are, in each case, concealed by the obstacles H and which restrict the field of view of an optical environment sensor, for example of a vehicle camera 2-i of the driver assistance system 1, are calculated by the data processing unit 4. In the case of the example represented in FIG. 1, the light beam which lies in contact with the extreme contour point P1 of the obstacle H1 defines the concealed region VB1 which restricts the field of view FOV1 of the front vehicle camera 2-1. In the same way the light beam, which passes the extreme contour point P2 of the obstacle H2 defines the concealed region VB2. This second concealed region VB2 is, on the one hand, delimited by the beam through the point P2 and, on the other hand, by the outer line of the field of vision FOV1 of the front vehicle camera 2-1. Furthermore, an additional concealed region VB3 is produced by the obstacle H2, which concealed region restricts the field of view FOV2 of the left vehicle camera 2-2.

The data processing unit 4 of the driver assistance system 1 processes, in one possible embodiment, image sensor data or camera images which originate from optical environment sensors 2-i, in the determined concealed regions VB. In one possible embodiment, the image sensor data or camera images in the determined concealed regions VB are filtered. In another possible embodiment, the concealed regions VB produced by the detected obstacles H are covered with textured surfaces or textures.

The driver assistance system 1 has a display or a display panel on which the vehicle environment of the vehicle F can be displayed to the driver of the vehicle F. To this end, camera images are projected onto a two-dimensional ground surface or onto a three-dimensional bowl-shaped projection surface. In one possible embodiment, the data processing unit 4 calculates the concealed regions VB produced by the detected obstacles H dependent on this projection surface used for representing the images.

Figure 2:
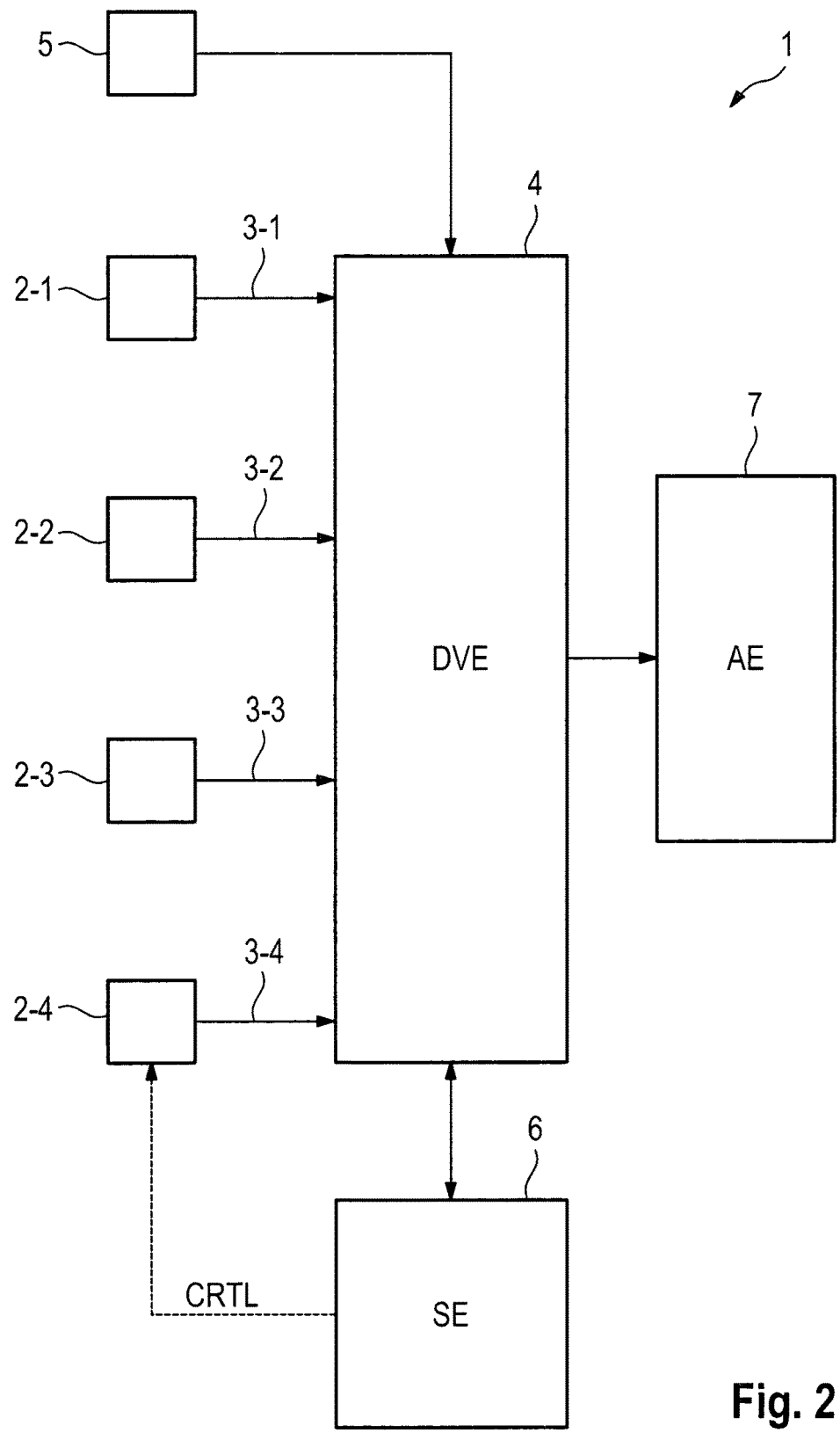
FIG. 2 shows a block wiring diagram in order to represent one embodiment of the driver assistance system according to the invention.

FIG. 2 shows a block wiring diagram in order to represent one embodiment of the driver assistance system 1 according to the invention. The data processing unit (DVE) 4 evaluates the sensor data which it obtains from environment sensors, in order to detect obstacles in the vehicle environment of the vehicle F. In this case, the environment sensors include, in addition to the optical environment sensors 2-$i$, in one possible embodiment, additional environment sensors, with which sensor data are evaluated by the data processing unit 4 in order to detect obstacles H in the vehicle environment of the vehicle F. In the case of the block wiring diagram represented in FIG. 2, an additional environment sensor 5 is represented by way of example, which supplies sensor data in order to detect obstacles H in the vehicle environment of the vehicle F. Furthermore, the driver assistance system 1 has, in the embodiment example represented in FIG. 2, a control circuit (SE) 6 which, in accordance with the determined concealed regions VB, controls optical environment sensors, in particular the vehicle cameras 2-1 to 2-4 represented in FIG. 2. In one possible embodiment, the control unit 6 switches between the image data flows generated by the vehicle cameras 2-$i$ in accordance with the determined concealed regions VB. In this case, the image sensor data or camera images, which comprise as few concealed regions VB as possible or concealed regions VB having as small an area as possible, are preferably switched through to the data processing unit 4. In the case of the example represented in FIG. 1, the front right region is normally graphically sensed by the front camera 2-1 and the corresponding image data are transferred to the data processing unit 4. On detecting the obstacle H1 and the resulting concealed region VB1, the control unit 6 of the driver assistance system 1 can switch over to the image data of the right vehicle camera 2-3, as the obstacle H1 does not produce a concealed region VB within the field of view FOV3 of the right vehicle camera 2-3. Therefore, in the scenario represented in FIG. 1, the right vehicle camera 2-3 supplies better-quality image data than the front vehicle camera 2-1, in the field of vision FOV1 of which the obstacle H1 is located and produces a concealed region VB1 there. In one possible embodiment, the data processing unit 4 considers, during the calculation of the concealed regions VB, the predefined fields of vision FOV of the relevant optical environment sensors or vehicle cameras 2-$i$. The fields of vision or viewing angles of the vehicle cameras 2-$i$ are, in one possible embodiment, stored in a configuration memory, to which a processor of the data processing unit 4 has access, in order to calculate the concealed regions VB in accordance with the selected fields of vision.

Figure 3:
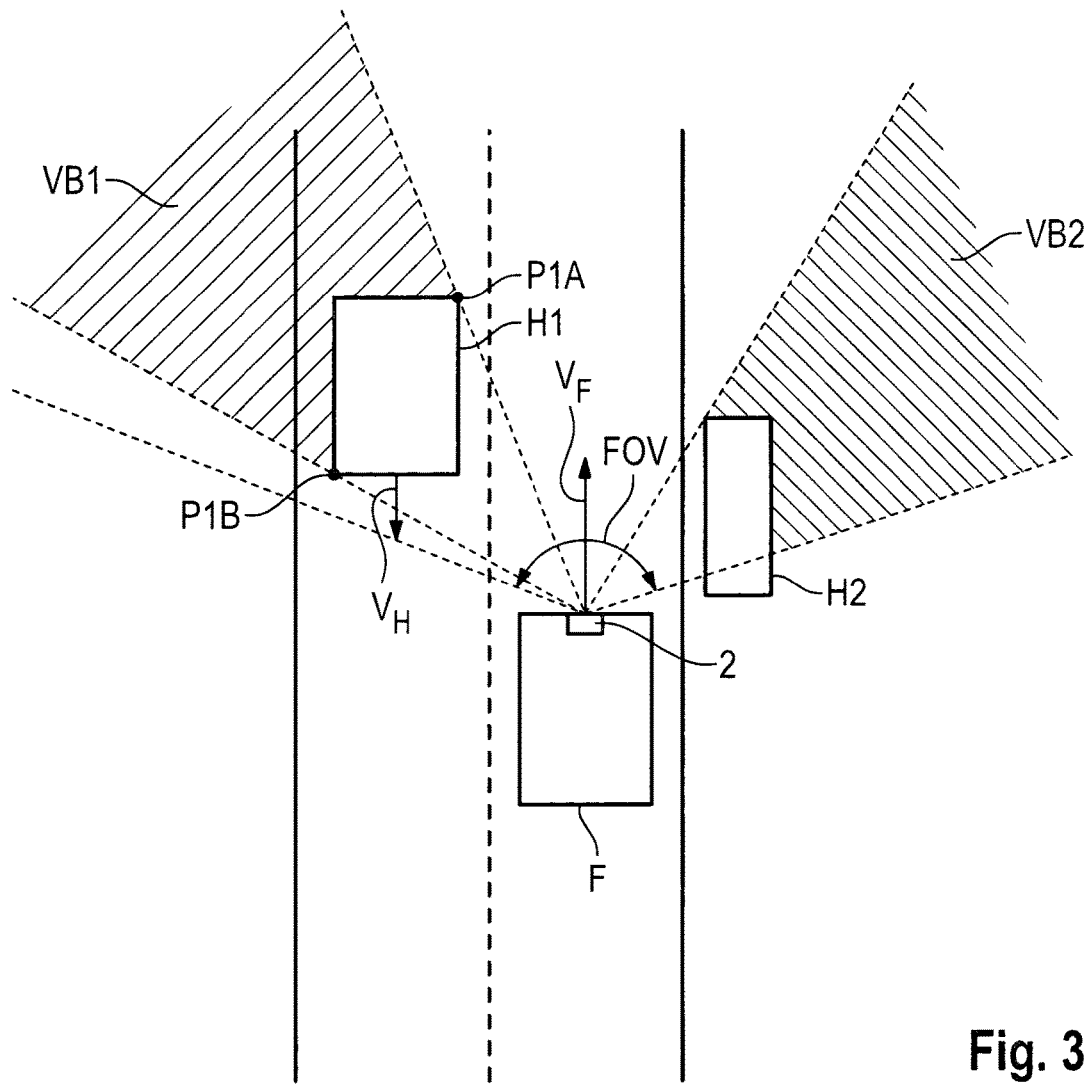
FIG. 3 shows a schematic representation in order to explain the mode of operation of the driver assistance system according to the invention.

FIG. 3 shows another traffic scenario in order to explain the mode of operation of the driver assistance system 1 according to the invention. In the traffic situation represented in FIG. 3, a vehicle F is moving at a speed $V_F$ on a road, wherein another vehicle, which constitutes an obstacle H1, is coming towards the vehicle F on the road. Located next to the road on the right is an obstacle H2, for example within the field of vision FOV of the front vehicle camera 2 of the vehicle F. A concealed region VB2 is produced by the obstacle H2 within the field of vision FOV of the vehicle camera 2, wherein the concealed region VB2 changes in accordance with the driving speed $V_F$ of the vehicle F. In contrast to the fixed obstacle H2, for example a building, the other obstacle H1, namely the oncoming vehicle, is itself moving relative to the vehicle F. The vehicle H1 obscures a concealed region VB1 within the field of vision FOV of the front vehicle camera 2, wherein the concealed region VB1 is dependent on the relative speed between the vehicle F and the vehicle H1. In one possible embodiment, the data processing unit 4 of the driver assistance system 1 calculates the concealed regions VB1, VB2 produced by the detected obstacles H1, H2 in accordance with the relative speed between the detected obstacles and the vehicle F. In the case of a fixed obstacle such as, for example, the obstacle H2, the relative speed taken as the basis in this case is the ego speed $V_F$ of the vehicle F. In the case of a mobile obstacle H1, for example an oncoming vehicle, the relative speed between the two vehicles is firstly determined on the basis of the sensor data, and subsequently the concealed region VB is calculated in accordance with the determined relative speed by the data processing unit 4. In one possible embodiment, the data processing unit 4 calculates the area of the respective concealed region VB2 approximately. If, for example, the two area contour points P1A, P1B of the oncoming obstacle H1 are set wide part, the area of the region VB1 concealed by said obstacle is considerably larger than in the case of a small distance between the two contour points P1A, P1B. If the oncoming vehicle H1 is, for example, a truck, the region VB1 concealed by said truck is, consequently, substantially larger than in the case of an oncoming car. The larger the area of the concealed region VB within the field of vision FOV of the relevant camera 2 is, the greater the adverse effect on the image quality of the vehicle images supplied by the corresponding vehicle camera is. In one possible embodiment, the control unit 6 of the driver assistance system 1 also considers, by means of switching or weighting the different camera image flows which are supplied by different cameras, the size or the proportion of the concealed regions VB present in the field of vision FOV of the relevant camera. If, for example, the proportion of the total of the concealed regions VB (VB1+VB2) in the camera images of the first front vehicle camera 2-1 is virtually 50%, as represented in the traffic scenario according to FIG. 3, the system switches, as of a certain threshold inasmuch as this is possible, to camera images which are supplied by other vehicle cameras of the vehicle F.

Figure 4:
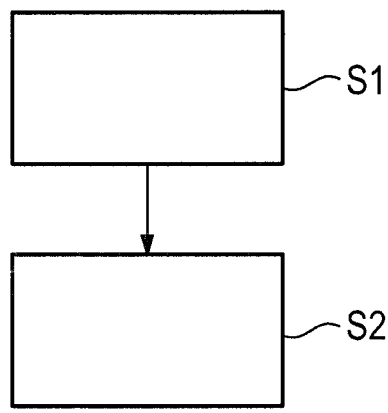
FIG. 4 shows a flow chart in order to represent one embodiment example of a method according to the invention for determining concealed regions in the vehicle environment of a vehicle.

FIG. 4 shows a flow chart in order to represent one embodiment example of the method according to the invention for determining concealed regions VB in the vehicle environment of a vehicle F.

In a first step S1, sensor data, which are generated by environment sensors of the vehicle F, are evaluated in order to detect obstacles H in the vehicle environment of the vehicle F. This is effected, for example, by a processor or microprocessor of the data processing unit 4 of a driver assistance system 1.

In a second step S2, concealed regions VB or concealed areas are calculated in accordance with the detected obstacles H. These concealed regions VB are produced by obstacles H in the vehicle environment and restrict a field of vision FOV of optical environment sensors of the driver assistance system 1.

Figure 5:
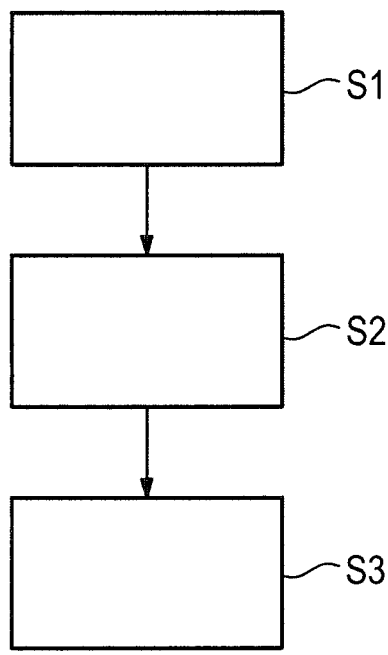
FIG. 5 shows another flow chart in order to represent another embodiment example of the method according to the invention.

FIG. 5 shows another embodiment example of the method according to the invention. In one possible embodiment, following the determination of the concealed regions VB, the image sensor data which originate from the optical environment sensors, in which image sensor data the determined concealed regions VB are located, are processed by the data processing unit 4 or another unit. In this case, the image sensor data of the relevant optical environment sensors or vehicle cameras, in the field of vision or field of view of which the concealed regions VB are located, can be filtered. Alternatively, the determined concealed regions within the camera images can be covered with textured surfaces.

In another possible embodiment, in step S3, the optical environment sensors are controlled, for example the system switches between different environment sensors, in accordance with the concealed regions VB determined or calculated in step S2. In this case, the size of the determined concealed regions VB or the proportion thereof of the entire field of vision FOV of the vehicle camera can also be considered.

In one possible embodiment, in step S2, a concealed region VB produced by a detected obstacle H is calculated in accordance with the pre-configured field of vision FOV of the relevant optical environment sensor 2-$i$. Furthermore, in step S3, the concealed regions VB can additionally be calculated in accordance with a relative speed between the detected obstacle H and the vehicle F.

The driver assistance system 1 according to the invention can be used for any vehicles, in particular road vehicles.

In one possible embodiment, the concealed regions VB determined by the method according to the invention are evaluated for additional functions of the driver assistance system 1. For example, in the case of one possible application, a traffic density on a public thoroughfare can be deduced from the proportion of the concealed regions VB of the fields of vision FOV of the vehicle camera 2-$i$. If, for example, a vehicle F is moving in the middle lane on a three-lane highway, large proportions of the fields of vision FOV of the vehicle cameras 2 are masked by other vehicles which are driving in the same direction on the highway, if the traffic density is high. The higher the traffic density on the road is, the greater the probability of traffic congestion arising is, in particular if a traffic bottleneck occurs as a result of a vehicle accident on the road. The proportion of the concealed areas VB within the field of vision FOV of a camera 2 consequently constitutes a measure of the current traffic density on the relevant road. This measure of traffic density can, in one possible embodiment, be evaluated for additional functions of the driver assistance system 1.

The invention claimed is:

1. A driver assistance system for a vehicle, comprising:
  environment sensors including optical environment sensors, configured to sense a vehicle environment of the vehicle; and
  a data processing unit, configured to evaluate sensor data of the environment sensors in order to detect obstacles in the vehicle environment;
  wherein the data processing unit is further configured to determine, from the sensor data, concealed regions in the vehicle environment dependent on the detected obstacles, which concealed regions are concealed from a respective view of at least a respective one of the optical environment sensors by the detected obstacles and restrict a respective field of view of the respective optical environment sensor, wherein the determining of the concealed regions comprises respectively determining, from the sensor data, at least one of a size, an extent and a contour of each respective one of the detected obstacles, and then calculating each respective one of the concealed regions from the respective determined size, extent and/or contour of the respective detected obstacle that conceals the respective concealed region.

2. The driver assistance system according to claim 1, wherein the data processing unit is configured to process, in particular to filter, the sensor data which originate from the optical environment sensors in the determined concealed regions.

3. The driver assistance system according to claim 1, wherein the data processing unit is configured to cover the concealed regions with textured areas in the sensor data for being displayed to a driver of the vehicle.

4. The driver assistance system according to claim 1, wherein the data processing unit is configured to calculate the concealed regions dependent on a projection surface used for representing images by projecting the sensor data onto the projection surface.

5. The driver assistance system according to claim 1, wherein the optical environment sensors are mounted on the vehicle, and further comprising a control circuit configured to actuate the optical environment sensors, in particular to switch between different ones of the optical environment sensors mounted on the vehicle, dependent on the concealed regions.

6. The driver assistance system according to claim 1, wherein the optical environment sensors comprise vehicle cameras, in particular fisheye cameras, which each have a predefined field of view.

7. The driver assistance system according to claim 6, wherein the data processing unit is configured to calculate the concealed regions dependent on the fields of view of the pertinent optical environment sensors.

8. The driver assistance system according to claim 1, wherein the data processing unit is configured to calculate the concealed regions dependent on a relative speed between the detected obstacles and the vehicle.

9. A method of determining concealed regions in a vehicle environment of a vehicle, comprising the following steps:
  (a) evaluating sensor data, which are generated by environment sensors including optical environment sensors of the vehicle, to detect obstacles in the vehicle environment; and
  (b) calculating, from the sensor data, dependent on the detected obstacles, concealed regions which are concealed from a respective view of at least a respective one of the optical environment sensors by the detected obstacles and restrict a respective field of view of the respective optical environment sensor, wherein the calculating of the concealed regions comprises respectively determining, from the sensor data, at least one of a size, an extent and a contour of each respective one of the detected obstacles, and then calculating each respective one of the concealed regions from the respective determined size, extent and/or contour of the respective detected obstacle that conceals the respective concealed region.

10. The method according to claim 9, further comprising processing, in particular filtering, the sensor data, which originate from the optical environment sensors of the vehicle in the calculated concealed regions.

11. The method according to claim 9, further comprising covering the concealed regions with textured areas in the sensor data for being displayed to a driver of the vehicle.

12. The method according to claim 9, wherein the concealed regions are calculated dependent on a projection surface used for representing images by projecting the sensor data onto the projection surface.

13. The method according to claim 9, wherein the optical environment sensors are mounted on the vehicle, and further comprising actuating the optical environment sensors, in particular switching between different ones of the optical environment sensors mounted on the vehicle, dependent on the concealed regions.

14. The method according to claim 9, wherein the concealed regions are calculated dependent on predefined fields of view of the pertinent optical environment sensors.

15. The method according to claim 9, wherein the concealed regions are calculated dependent on a relative speed between the detected obstacles and the vehicle.

16. The method according to claim 9, wherein the calculating of the concealed regions further comprises defining a boundary of a respective one of the concealed regions by a light beam that extends from an extreme outermost contour point of a respective one of the detected obstacles to a respective one of the optical environment sensors.

17. A method of operating a driver assistance system of a vehicle having a display, a data processor and sensors including a first optical sensor mounted on the vehicle, wherein the method comprises the steps:
  a) with the sensors, sensing an environment outside of the vehicle and producing sensor data that represents features of the environment;
  b) with the data processor, evaluating the sensor data, and from the sensor data, detecting an obstacle that exists in the environment, determining that the obstacle conceals, from the first optical sensor, a concealed region in a field of view of the first optical sensor, determining at least one of a size, an extent and a contour of the obstacle, and calculating the concealed region from the determined size, extent and/or contour of the obstacle;
  c) with the data processor, further processing the sensor data to produce processed data dependent on and in response to the calculated concealed region; and
  d) on the display, displaying information determined from the processed data, wherein the information is adapted to assist a driver of the vehicle in performing a driving maneuver of the vehicle.

18. The method according to claim 17, wherein the further processing comprises filtering the sensor data dependent on and in response to the calculated concealed region.

19. The method according to claim 17, wherein the further processing comprises covering the calculated concealed region of the sensor data with a textured area to be displayed in the information on the display.

20. The method according to claim 17,
  wherein the sensors further include a second optical sensor mounted on the vehicle,
  wherein the method further comprises, from the sensor data, determining whether any object in the environment conceals from the second optical sensor any concealed region in a field of view of the second optical sensor, and calculating any such concealed region in the field of view of the second optical sensor; and
  wherein the further processing of the sensor data comprises determining that any such concealed region in the field of view of the second optical sensor is less extensive in area or proportion than the concealed region in the field of view of the first optical sensor, and switching from the sensor data produced by the first optical sensor to the sensor data produced by the second optical sensor being included in the processed data.

21. The method according to claim 17, wherein the calculating of the concealed region is further dependent on a relative speed between the vehicle and the obstacle.

22. The method according to claim 17, further comprising determining, from the processed data, a measure of a traffic density of traffic on a road on which the vehicle is driving.

* * * * *